Patented Feb. 7, 1928.

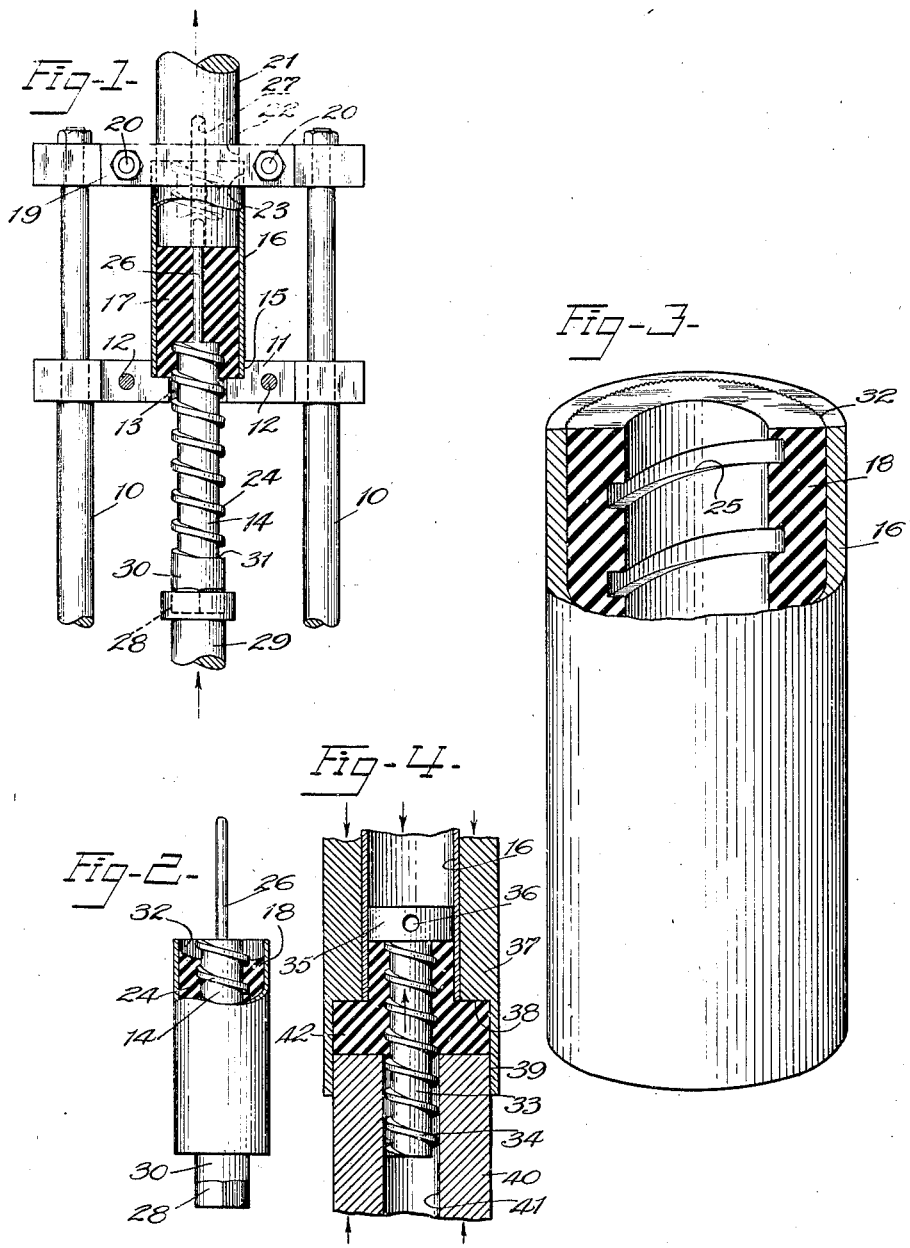

1,658,564

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR SHAPING PLASTIC MATERIAL.

Application filed April 5, 1924, Serial No. 704,503. Renewed August 15, 1927.

This invention relates to the art of forming articles of plastic material and is of especial value in applying to a tubular structure a lining of plastic material having an embossed or recessed inner surface, as in the case of the rubber-lined bearing shown in the accompanying drawings. The present invention is in certain aspects an improvement upon that shown and described in my co-pending application, Serial No. 697,009, filed March 5, 1924, and the procedure and apparatus described herein include certain features which are described and claimed in my co-pending application, Serial No. 713,077, filed May 13, 1924.

In the invention of said application an article is formed of plastic material by closely enclosing a mass of stock in a space defined by three shaping members and then so moving each of the latter with relation to the others as to change the shape of said space to that desired in the article, whereby the required flow of stock with relation to the shaping members is reduced as compared with ordinary methods of flowing stock against shaping members. When one of the shaping members is formed with a helical rib or groove, as in members adapted to form a certain type of rubber bearing, I find it desirable to employ certain improvements in the matter of maintaining the shaping-members in proper alignment.

The chief objects of my present invention are to provide improved procedure and apparatus for forming from plastic material an article having a helically grooved or ribbed surface. A further object is to provide improved procedure and means for centering a mandrel, and more particularly a helically ribbed mandrel, while forcing it into a mass of plastic stock to shape the latter against retaining means.

Of the accompanying drawings, Fig. 1 is an elevation, partly in section, of a metal bearing sleeve, a mass of unvulcanized rubber therein, and associated instrumentalities for forming said mass of rubber as a bushing or lining within said sleeve.

Fig. 2 is an elevation, partly in section, of a rubber lined bearing constituting the finished work, with a spirally ribbed or threaded mandrel therein, as the same appears at the end of the forming operation, a part of the rubber lining being broken away.

Fig. 3 is an elevation on a larger scale, partly in section, of the finished work as it appears after the mandrel is removed.

Fig. 4 is a vertical section of a modification.

Referring at first to Fig. 1 of the drawings, a pair of upright posts 10, 10 have mounted upon their reduced upper end portions a sectional bridge or work-support, the principal member of which is shown at 11, the same being formed to receive an interfitting, complemental section, which is omitted for clearness of illustration, and which is secured to the section 11 by bolts 12, 12. Said work support is formed with a central aperture 13 for the passage of a mandrel 14, and with a counter-bore 15 on its upper side, concentric with the aperture 13, to receive a bearing sleeve 16 stepped therein, said sleeve containing a mass of unvulcanized rubber compound 17, preferably of measured quantity, to be formed as a bushing or a lining 18 (Figs. 2 and 3), in the bearing sleeve 16.

For holding the sleeve 16 in vertical alignment and for preventing it from rising from the support 11, a sectional clamping structure 19, provided with clamping bolts 20, 20, is secured upon the upper ends of the posts 10 and formed with a central aperture 22 adapted to accommodate, with a sliding fit, a pressure member 21, which is adapted also to enter the sleeve 16 with a sliding fit, the clamping structure 19 being formed on its under side with a counter-bore 23 concentric with the aperture 22 and adapted to receive the upper end of the sleeve 16, for clamping the latter between the sections of the clamping structure.

The mandrel 14 is formed with a helical thread or rib 24 adapted to mold a spiral groove 25 (Fig. 3) in the rubber bushing 18. The mandrel is also formed with a dowel pin 26 projecting axially from its upper end and adapted to mate with a dowel aperture 27 formed in the lower end of the pressing member 21, for centering the mandrel as it is forced into the mass of stock 17. The lower end of the mandrel is squared, as shown at 28, and fitted into a complemental recess in the upper end of a mandrel-advancing member 29, the latter being adapted to be moved axially toward the work to advance the mandrel 14 into the mass of stock 17. The helical rib 24 merges at its lower end in an enlarged cylindrical portion 30 of the mandrel, which provides a shoulder 31 adapted to abut the plastic mass 17 when the mandrel is fully advanced into the work.

In the operation of the apparatus a mass of warmed, unvulcanized rubber compound 17, preferably of such quantity as to form the rubber bushing 18 without substantial overflow or excess, is mounted in the sleeve 16. The sleeve and the mandrel are preferably heated, so that the stock will adhere thereto as well as to make it flow freely. The mass may be given an axially apertured, cylindrical form before being mounted in the sleeve, as by extruding the material from a tubing machine and cutting it into lengths, although I do not limit myself to this procedure. The sleeve, with the stock 17 therein, is then mounted and clamped in the apparatus as shown in Fig. 1. The mandrel 14 is then raised from below until the upper end of its threaded portion abuts the lower face of the plastic mass, the dowel pin 26 extending upward through the mass, and the pressing member 21 is inserted in the sleeve 16 from above, its dowel aperture 27 receiving the upper end of the dowel pin 26. The pressing member 21 is then held downward upon the plastic mass 17 while the mandrel 14 is forced upward into the mass from below, such movement of the member 21 being effected as not to cause the plastic material to be extruded to any considerable extent from the lower end of the sleeve as the mandrel is forced into the mass, the member 21 being permitted to rise only as the top level of the plastic mass in the sleeve 16 rises as the result of the progress of the mandrel into the mass. Such movement of the member 21 may be effected by maintaining a yielding downward pressure upon it, but I do not wholly limit myself to maintaining such yielding pressure. The mandrel 14 may be either forced into the plastic mass without rotation, the rubber flowing both longitudinally between the turns of the thread 24 and transversely over said turns, or the mandrel may be rotated as it is forced into the mass, so as to screw it thereinto and avoid the necessity of a flow of the rubber transversely over successive convolutions of the thread.

When the mandrel has been forced until its upper end portion is in the position shown in dotted lines in Fig. 1, the pressing member 21 receding accordingly, the sleeve 16 with the bushing 18 and the mandrel 14 therein are removed from the clamping means 11, 19, the mandrel and the work then being as shown in Fig. 2, where the upper portion of the bushing 18 is broken away to show corrugations 32 which may be formed on the inner surface of the sleeve 16 to prevent rotation of the bushing therein during use.

The work, in the condition shown in Fig. 2, is then vulcanized, after which the mandrel is removed by unscrewing it from the work by means of its squared end portion 28, to which a wrench or the like may be applied. The finished product is then as shown in Fig. 3.

In the modification shown in Fig. 4, a mandrel 33 is formed with a helical thread or rib 34, to mold the groove 25 of Fig. 3, and with a head 35 at one end slidably fitting within the sleeve 16, a transverse aperture 36 in said head being adapted to receive a bar for unscrewing the mandrel from the work. The sleeve 16 is fitted within a cylindrically hollow pressing member 37, with its lower end flush with a shoulder 38 formed on the interior of said member, which is formed with an annular flange or wall 39 extending from the outer periphery of said shoulder and telescoped over a male pressing member 40. The latter is formed with an axial bore 41 adapted to accommodate the threaded portion of the mandrel 33 with a sliding fit.

In the operation of this modified type of apparatus, an annular mass of the unvulcanized rubber compound, 42, is mounted upon the mandrel, against the head 35 of the latter, and the opposite end of the mandrel is inserted in the bore 41 of the pressing member 40. The sleeve 16 and the pressing member 37 in which it is mounted are then assembled upon the mandrel-head 35 and the pressing member 40 and while held against relative axial movement are forced toward said member 40 with such pressure as to cause the stock to rise in the sleeve 16, bearing against the head 35 of the mandrel and carrying the latter upward with it, the threaded portion of the mandrel thus being caused to move upward into the sleeve 16, with the flowing stock. The upward movement of the mandrel may be resisted, if necessary or desired, in order to increase the pressure of the plastic mass and thereby assure that it will conform to the mandrel at all points.

When the rubber bushing, as shown at 18 in Fig. 3, is thus completely formed, the work, with the mandrel therein, is removed from the pressing member 37 and vulcanized, and the mandrel is unscrewed therefrom, provided a structure substantially as shown in Fig. 3.

In this modification the stock flows directly from the unformed mass into the space between the convolutions of the thread or rib 34 of the mandrel, as said convolutions rise successively into the mass, so that the necessity of flowing the stock in a long column past said convolutions and into the space between them is avoided. Relative movement between the threaded mandrel and the adjacent stock is thus minimized, the mandrel moving with the flow of stock adjacent to it, so that great pressures are not required in order to conform the stock to the mandrel. This feature is claimed in my co-pending application, Serial No. 713,077, filed May 13, 1924.

Further modifications may be resorted to without departing from the scope of my invention, and I do not wholly limit my claims to the specific construction shown.

1. The method of shaping a helically channeled, tubular article of plastic material which comprises flowing the material into a space between a mandrel member and a female shaping member while centering the mandrel member by engagement with both of its ends and effecting movement of one of said members in the direction of the flow of stock and at approximately the same speed, whereby the material is given a helically channeled form against helical elements on one of said members, and unscrewing from said material the member which gives it its helically channeled form.

2. The method of shaping an article of plastic material which comprises giving an annular form to an integral, coherent mass of plastic stock and attenuating said mass by flowing it longitudinally of a mandrel structure as a coating upon the latter while maintaining alignment of the mandrel by engagement with its end portions beyond the annular mass of stock.

3. The method of shaping a hollow article of plastic material which comprises screwing a helically threaded mandrel into a confined mass of stock while constraining the stock to flow under pressure ahead of said mandrel so as to elongate in conformance therewith, and then unscrewing said mandrel from the formed mass.

4. The method of mounting in a tubular structure a lining of plastic material having an internal, helical channel which comprises impelling a supply mass of stock progressively forward ahead of a threaded mandrel in said structure while maintaining such pressure upon the leading face of the stock as to cause it to be given off into the space between said structure and said mandrel, and unscrewing said mandrel from the formed mass.

5. The method of mounting a lining in a tubular structure which comprises impelling a supply mass of stock progressively forward ahead of a threaded mandrel in said structure while maintaining such pressure upon the leading face of the stock as to cause it to be given off into the space between said structure and said mandrel and while rotating said mandrel in the positive direction with relation to its thread.

6. Apparatus for shaping a helically channeled article of plastic material, said apparatus comprising a female shaping member, a mandrel longitudinally movable therein, the molding surface of one of the same being formed with a helical rib adapted to mold a groove in a face of the article, means for flowing plastic stock into the space between the two while permitting relative axial movement of the two, and means engaging both ends of the mandrel for centering the same.

7. Apparatus for shaping an article of plastic material, said apparatus comprising a mandrel structure, means engaging the respective end portions of the same for maintaining it in alignment, and means for longitudinally extending upon said mandrel structure as a relatively thin coating thereon an annular, integral, coherent mass of plastic stock surrounding the same.

8. Apparatus for shaping a mass of plastic material, said apparatus comprising a female shaping member, a helically threaded mandrel longitudinally movable therein, and means longitudinally movable within said female member ahead of said mandrel for maintaining a pressure upon the leading face of a mass of stock as it is forced forward in advance of said mandrel in said female shaping member.

9. Apparatus for shaping a mass of plastic material, said apparatus comprising a female shaping mandrel, a helically threaded member longitudinally movable therein, and adapted to be rotated as it is so moved, and means movable within said female member for maintaining a pressure upon the leading face of a mass of stock as it is forced forward in advance of said mandrel in said female shaping member.

10. Apparatus for shaping an article of plastic material, said apparatus comprising a female shaping member, a pair of opposed, male shaping members therein, each of said shaping members being axially movable with relation to the others, and dowel means interposed operatively between said male shaping members for maintaining them in alignment with each other.

11. Apparatus for shaping an article of plastic material, said apparatus comprising a female shaping member, and a pair of opposed, male shaping members therein, each of said shaping members being axially movable with relation to the others, and one of said male shaping members extending through the stock-accommodating space defined by said members and being adapted to be held in alignment by engagement on both sides of said space.

In witness whereof I have hereunto set my hand this 2nd day of April, 1924.

FRANK J. MacDONALD.

CERTIFICATE OF CORRECTION.

Patent No. 1,658,564.   Granted February 7, 1928, to

FRANK J. MacDONALD.

It is hereby certified that error appears in the printed specification of the above numbered patent requiring correction as follows: Page 1, line 43, for the misspelled word "accompanaying" read "accompanying"; page 2, line 34, for "be ng" read "being", and line 117, for "provided" read "providing"; page 3, line 95, claim 9, for the word "mandrel" read "member", and line 96, for "member" read "mandrel"; and that the said Letters Patent should be read with these corrections therein that the same may conform to the record of the case in the Patent Office.

Signed and sealed this 10th day of April, A. D. 1928.

(Seal)

M. J. Moore,
Acting Commissioner of Patents.